(12) United States Patent
Shad et al.

(10) Patent No.: US 8,867,594 B2
(45) Date of Patent: Oct. 21, 2014

(54) INFERRING PRESENCE AND IDENTITY OF NON-LINEAR DEVICES ON A POWERLINE COMMUNICATION NETWORK

(71) Applicant: QUALCOMM Incorporated, San Diego, CA (US)

(72) Inventors: Faisal Mahmood Shad, Ocala, FL (US); Lawrence Winston Yonge, III, Summerfield, FL (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 13/842,873

(22) Filed: Mar. 15, 2013

(65) Prior Publication Data

US 2013/0315286 A1 Nov. 28, 2013

Related U.S. Application Data

(60) Provisional application No. 61/650,704, filed on May 23, 2012.

(51) Int. Cl.
*H04B 3/46* (2006.01)
*H04B 3/54* (2006.01)

(52) U.S. Cl.
CPC .......... *H04B 3/54* (2013.01); *H04B 2203/5425* (2013.01); *H04B 2203/5495* (2013.01); *H04B 2203/5466* (2013.01)
USPC .......................................................... 375/224

(58) Field of Classification Search
CPC ............. H04B 3/54; H04B 2203/5425; H04B 2203/5495
USPC .......................................................... 375/224
See application file for complete search history.

(56) References Cited

U.S. PATENT DOCUMENTS

| 4,994,675 | A * | 2/1991 | Levin et al. .................. 250/551 |
| 6,232,901 | B1 * | 5/2001 | Abbey .......................... 341/143 |
| 6,519,026 | B1 * | 2/2003 | Holland ....................... 356/73.1 |
| 6,658,362 | B1 * | 12/2003 | Holden et al. ............... 702/108 |
| 6,917,888 | B2 | 7/2005 | Logvinov et al. |

(Continued)

FOREIGN PATENT DOCUMENTS

WO 03094765 A2 11/2003

OTHER PUBLICATIONS

International Search Report and Written Opinion—PCT/US2013/042448—ISA/EPO—Aug 27, 2013.

(Continued)

*Primary Examiner* — Juan A Torres
(74) *Attorney, Agent, or Firm* — DeLizio Gilliam, PLLC

(57) ABSTRACT

A non-liner device (NLD) between powerline communication (PLC) devices can introduce significant distortion into the channel being utilized by the PLC devices. This distortion can create errors and corrupt data transmitted by the PLC devices. When trying to mitigate the effects of the distortion introduced by NLDs, PLC devices conform their mitigating actions to effectively satisfy a limit(s) set by a regulation and/or a standard. A PLC device implemented in accordance with this disclosure can mitigate the distortion effects with deference to regulatory/standard limits without knowledge of what types of NLDs and how many NLDs are coupled to the power line. A PLC device can use different techniques to infer the presence of an NLD in a PLC network. A PLC device can infer the presence of the NLD using a passive technique or one or more active techniques.

20 Claims, 6 Drawing Sheets

(56) References Cited

U.S. PATENT DOCUMENTS

| | | | |
|---|---|---|---|
| 7,006,445 B1* | 2/2006 | Cole et al. | 370/247 |
| 7,091,849 B1 | 8/2006 | Henry | |
| 8,094,034 B2 | 1/2012 | Patel et al. | |
| 2003/0225893 A1* | 12/2003 | Roese et al. | 709/227 |
| 2004/0036478 A1* | 2/2004 | Logvinov et al. | 324/534 |
| 2005/0233702 A1* | 10/2005 | Ferguson | 455/67.14 |
| 2008/0091345 A1* | 4/2008 | Patel et al. | 701/208 |
| 2009/0072985 A1* | 3/2009 | Patel et al. | 340/657 |
| 2011/0053528 A1 | 3/2011 | Cunningham | |
| 2012/0093240 A1* | 4/2012 | McFarland et al. | 375/257 |

OTHER PUBLICATIONS

"PCT Application No. PCT/US2013/042448 International Preliminary Report on Patentability", Jun. 30, 2014, 9 pages.

* cited by examiner

US 8,867,594 B2

INFERRING PRESENCE AND IDENTITY OF NON-LINEAR DEVICES ON A POWERLINE COMMUNICATION NETWORK

RELATED MATTER

This non-provisional patent application claims benefit of U.S. Provisional Application No. 61/650,704, which was filed on 23 May 2012, in accordance with 35 U.S.C. §119.

BACKGROUND

Embodiments of the inventive subject matter generally relate to the field of communication networks, and, more particularly, to adjusting transmit power in powerline communication devices for communication in powerline communication networks with non-linear devices.

A non-linear device (NLD) is an electrical device having non-linear voltage-current characteristics due to presence of electrical components such as a diode, an operational amplifier, switching power supplies, electronic lamp ballasts, etc. A wide variety of electrical devices such as florescent lamps, alternating current (AC) adapters, and motorized tools include these electrical components and exhibit the characteristics of an NLD. NLDs have similar effects as other electrical devices on signals generated by electrical equipment connected to a power line, and the radio frequency signals carried by the power line. However, NLDs may cause second or higher order harmonics, and intermodulation effects on high frequency signals used for communication in a powerline communication network.

SUMMARY

Various embodiments are disclosed for inferring presence and identity of non-linear devices coupled to a power line of a powerline communication network. In some embodiments, an electronic signature is determined from a signal captured from a power line of a powerline communication network. Presence and identity of a non-linear device on the power line is inferred based, at least in part, on the electronic signature. Information specified for a non-linear device with the inferred identity is retrieved. One or more distortion mitigating adjustments to apply when transmitting data on the power line to at least avoid violating a limit are determined. The distortion mitigating adjustments are determined based, at least in part, on the information specified for the non-linear device. The one or more distortion mitigating adjustments are indicated for application to a data transmission on the power line.

DESCRIPTION OF EMBODIMENT(S)

Figure 1:
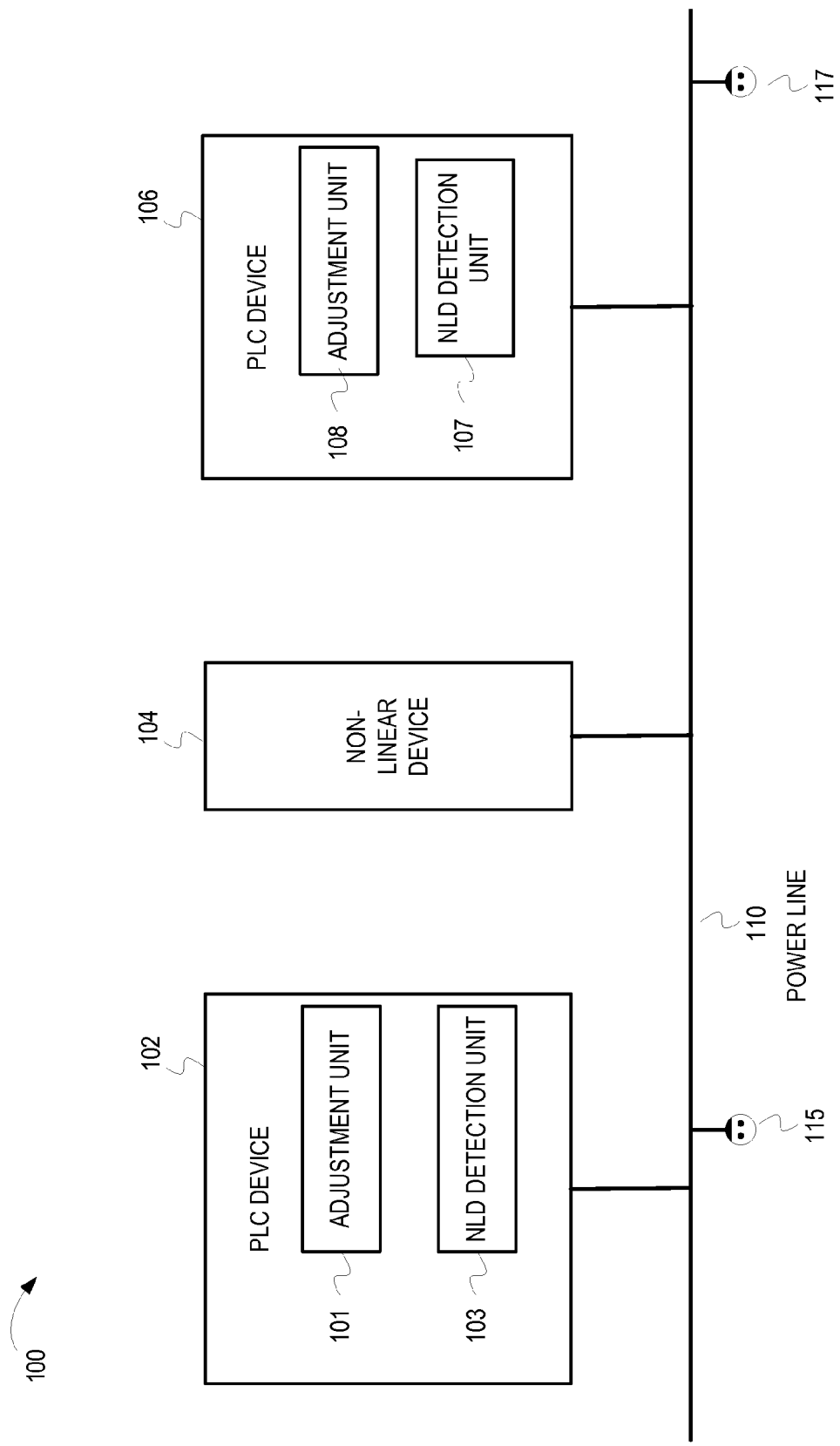
FIG. 1 depicts an example conceptual diagram of a powerline communication network (PLC) network with PLC devices that each has an NLD detection unit and an adjustment unit.

The description that follows includes example systems, methods, techniques, instruction sequences and computer program products that embody techniques of the inventive subject matter. However, it is understood that the described embodiments may be practiced without these specific details. For instance, although examples refer to detection of an NLD in a powerline communication (PLC) network and applying adjustments at a transmitter in a PLC device, embodiments are not so limited. In other embodiments, multiple NLDs can be simultaneously detected in parallel and accordingly adjustments may be applied at the transmitter of the PLC device. In other instances, well-known instruction instances, protocols, structures and techniques have not been shown in detail in order not to obfuscate the description.

TERMINOLOGY

Some terms used in this specification have meanings understood by those of ordinary skill in the art, but may be susceptible to unexpected and/or unusual interpretations by persons construing the claims. In this specification, a "radiated emission" refers to electromagnetic energy unintentionally released from a device or device element. In the context of the inventive subject matter, a radiated emission is electromagnetic energy unintentionally released from an NLD on a PLC network. In addition to the NLD(s), the PLC devices on the PLC network also behave as unintentional radiators, and the total radiated emissions from all sources are subject to the regulatory limits. Although a radiated emission on the PLC network is typically produced from an unintentional radiator, a radiated emission may also be produced by an intentional radiator of an NLD at frequencies inside as well as outside of the intended transmission frequency band. This specification also uses the term "electronic signature." An electronic signature for an NLD is a characterization of the electronic characteristics of the NLD. The electronic signature can be characterized by a single parameter (e.g., measurement of voltage (or current) over time), or by multiple parameters (e.g., measurement of voltage (or current) as a function of time, voltage envelope, and peak to average power level). This description also refers to capturing a signal and signals. This seemingly inconsistent reference to signal/signals arises from the different perspectives of the physical activity on a power line. When multiple devices are coupled to a power line, each of the devices create physical activity represented by a signal, thus multiple signals are injected onto the power line. But, from the perspective of a device listening/monitoring the power line (e.g., a powerline communication device), a single observed signal represents the cumulative physical activity on the power line. After processing the single observed signal, the observing device may decompose the signal into multiple electronic signatures that correspond to multiple signal sources. In other words, the physical activity on the power line initially perceived as a single signal is now perceived by the observing device as multiple signals. The description also uses the term "perceived PLC network topology." A perceived PLC network topology is used herein to refer to NLDs inferred as present on a PLC network, including types of NLDs and number of NLDs. Data representing perceived PLC network topology can also indicate other nodes on the PLC network (e.g., other PLC devices, devices that are not NLDs), structure of the PLC network (e.g., branches, loops, etc.), and electrical distance between nodes.

Overview

The presence of non-linear devices (NLDs) on a powerline communication network can create problems for the powerline communication network. An NLD between powerline communication (PLC) devices, referred to sometimes herein as an intervening NLD, can introduce significant distortion into the channel being utilized by the PLC devices. This distortion can create errors and corrupt data transmitted by the PLC devices. When trying to mitigate the effects of the distortion introduced by NLDs, PLC devices conform their mitigating actions to effectively satisfy (a) limit(s) set by a regulation and/or a standard. A PLC device implemented in accordance with this disclosure can mitigate the distortion effects with deference to regulatory/standard limits without knowledge of what types of devices and how many devices are coupled to the power line. A PLC device can use different techniques to infer the presence of an NLD in a PLC network. A PLC device can infer the presence of the NLD using a passive technique or one or more active techniques. For example, with the passive technique, a PLC device listens to a power line medium while a powerline communication network is idle (i.e., none of the PLC devices in the PLC network are transmitting). The PLC device can determine an electrical signature, and attribute the electrical signature to an NLD on the power line medium. With an active technique, a PLC device transmits a test signal on the power line medium and then determines an electrical signature and attributes the electrical signature to an NLD using the transmitted test signal. A PLC device can also estimate the distance of an NLD from the PLC device by measuring the received signal strength of a signal having the electrical signature attributed to the NLD. In response to inferring presence of an NLD, a PLC device can adjust the transmit power levels of a signal at the output of the PLC device, or the PLC device may avoid transmitting in the time interval where non-linear distortions occur, such as during a particular phase of the 50 Hz or 60 Hz AC line cycle.

In some embodiments, a PLC device can adjust the transmit power spectral density (PSD) of an output signal to mitigate the effects of radiated emissions in the frequencies outside the PLC frequency band (1 MHz-30 MHz). For example, the PLC device can reduce the transmit power at certain frequencies that lead to the most pronounced intermodulation effects. The PLC device can also reduce transmit power during certain periods or phases of the alternating current (AC) line cycle (50/60 Hz) for which intermodulation effects are present. The PLC device can mitigate the effects of higher order intermodulation (e.g., second order intermodulation, third order intermodulation, etc.) by applying such adjustments.

Example Illustrations

FIG. 1 depicts an example conceptual diagram of a PLC network with PLC devices that each has an NLD detection unit and an adjustment unit. FIG. 1 depicts a PLC network 100. The PLC network 100 includes an outlet 115, an outlet 117, a PLC device 102 that has an adjustment unit 101 and an NLD detection unit 103, a non-linear device 104, and a PLC device 106 that has an adjustment unit 108 and an NLD detection unit 107. The outlets 115, 117 are depicted to illustrate the network as a PLC network. The PLC device 102, the NLD 104, and the PLC device 106 are coupled to the powerline communication network 100 via a power line 110. The powerline communication network 100 may be a communication network based on one of the powerline communication standards (e.g., HomePlug® 1.0 standard, HomePlug AV standard, HomePlug AV2 standard, etc.). The power line 110 may be a two-wire electrical cord, a three-wire electrical cord, or other suitable cord, wire, or cable capable of transmitting electricity. The NLD 104 is an electrical device having non-linear voltage-current characteristics (e.g., the NLD 104 can include any one of a diode, an operational amplifier, etc.). The PLC devices 102 and 106 may be various types of network devices that have powerline communication capabilities. For example, the PLC devices 102 and 106 may be desktop computers, smart appliances, network routers, powerline communication adapters, and/or other network devices. For simplicity, FIG. 1 depicts a single NLD 104, the PLC device 102 and the PLC device 106. However, a powerline communication network can have multiple NLDs and a different number of PLC devices than in the depicted example. Further, for the purpose of simplification, FIG. 1 does not include all components of the PLC devices 102 and 106 (e.g., a power line transmitter, a power line receiver, processor, memory, etc.).

The NLD detection unit 103 in the PLC device 102 processes signals on the power line 110. The NLD detection unit 103 analyzes the signals to determine one or more electrical signatures. The NLD detection unit 103 compares the determined electrical signatures against known electrical signatures (e.g., using a database of device electrical characteristics) and infers the presence of the NLD 104 on the power line 110 based at least in part on a comparison between a determined electrical signature and one of the known electrical signatures. For example, a PLC device can compare the determined electrical signature against known electrical signatures to identify one of the known electrical signatures with a greatest similarity to the determined electrical signature. The NLD detection unit 103 can infer the presence and identity of NLDs using a passive technique or an active technique (as will be further described below). Analysis of the signals detected on the power line 110 can include the NLD detection unit 103 measuring voltage and current values on the power line 110 over a time period. The NLD detection unit 103 can identify or categorize the NLD 104 using the voltage and current values measured on the power line 110 over the time period. For example, the NLD detection unit 103 can determine that the variation in output voltage at the NLD 104 over the time period corresponds to a device that has a diode. The NLD detection unit 103 can also determine power spectral density (PSD) of electrical signals attributed to the NLD 104. The NLD detection unit 103 can also estimate position (e.g., distance and direction with respect to the listening PLC device) of the NLD 104 using the received signal strength of the signal that has the electrical signature attributed to the NLD 104. The NLD detection unit 103 can store the information inferred about the NLD device 104 (e.g., the type of device, the position from the PLC device 102, etc.) at the PLC device 102. The NLD detection unit 103 may also send the information to the adjustment unit 101.

The adjustment unit 101 in the PLC device 102 can determine adjustments for a transmitter in the PLC device 102 to reduce intermodulation effects using distortion attributed to the NLD 104. For example, second order intermodulation may occur due to a squaring of the input voltage into the NLD 104. The squaring of voltage results in the generation of a spectral component at a frequency $f_1 \pm f_2$, where $f_1$ and $f_2$ are two of the carrier frequencies in a broadband signal input into the PLC network 100 by a PLC device and received as the input to the NLD 104. Second order intermodulation can cause a significant increase in the interference to the radio receivers on the PLC network 100 which operate at or near the $f_1 \pm f_2$ frequency. Similarly, the NLD 104 may generate second and higher multiples of the single tone frequencies input into the NLD 104 (i.e., higher order harmonics). The adjustment unit 101 can determine transmit PSD adjustments for the transmitter in the PLC device 102 to mitigate the effects of intermodulation and higher order harmonics produced by the NLD 104. For example, the adjustment unit 101 may determine that the NLD 104 causes second order intermodulation, and the adjustment unit 101 may reduce the transmit power level at the carrier frequencies accordingly. Similarly, the adjustment unit 101 may reduce transmit power levels at those carrier frequencies for which integral multiples lie in frequency bands reserved for other RF communications. In some embodiments, the adjustment unit 101 can determine certain periods or phases of the AC line cycle during which intermodulation effects are greater. Intermodulation effects may be more pronounced for a certain duration in an AC line cycle period and the duration may be periodic over multiple AC line cycle periods. The adjustment unit 101 can reduce the transmit power levels or avoid transmitting PLC signals during those durations of the AC line cycle period for which intermodulation effects are more pronounced.

The adjustment unit 101 can limit the radiated emissions due to the higher order harmonics as well as the higher order intermodulation attributed to the NLD 104 as determined by the NLD detection unit 103 by applying adjustments in the transmitter of the PLC device 102. The NLD detection unit 103 and the adjustment unit 101 allow mitigation of intermodulation and higher order harmonics without requiring a user to modify power levels of a signal input into the PLC device 102. For simplification, only the functions of the NLD detection unit 103 and the adjustment unit 101 in the PLC device 102 are described in detail. The NLD detection unit 107 and the adjustment unit 108 in the PLC device 106 can perform operations similar to the NLD detection unit 103 and the adjustment unit 101 in the PLC device 102, respectively.

As stated earlier, the NLD detection units can infer the presence and identity of NLDs using a passive technique or one of multiple active techniques. In addition, the adjustment units can adjust transmit power of signals using determined NLD distortion in different manners depending upon how the NLD distortion is determined. With the passive technique, the transmitters of the PLC device 102 and the PLC device 106 are turned off. The NLD detection unit 103 in the PLC device 102 can detect out-of-band signals (i.e., signals outside the PLC frequency band) and determine the power spectral density of the signals attributed to the NLD 104. The NLD detection unit 103 can also estimate the electrical distance (i.e., the distance on the power line 110) between the PLC device 102 and the NLD 104 for a particular path using strength of signals attributed to the NLD 104 along the particular path. In some cases, multiple paths can exist between a PLC and an NLD in a PLC network. The NLD detection unit 103 can average the received signal strength of signals received over a certain time period to estimate the electrical distance of the NLD 104 from the PLC device 102. The adjustment unit 101 in the PLC device 102 can determine adjustments for the transmit PSD and apply the adjustments to the transmitter of the PLC device 102 such that the radiated emissions from the NLD 104 as influenced by transmissions from the PLC device 102 are within permissible limits as defined by relevant regulations or standards (e.g., 47 C.F.R. 15, CISPR-22, etc.). The adjustment unit 101 may determine adjustments for transmit power levels at certain carrier frequencies. The adjustment unit 101 can determine the adjustments for the transmit PSD using the inferred type of the NLD 104, the estimated position of the NLD 104 with respect to the PLC device 102, etc. For example, the adjustment unit 101 can utilize the determined electrical signature to infer the type of NLD. Also, the adjustment unit 101 can utilize the estimated position of the NLD 104 to estimate attenuation over the power line 110 between the PLC device 102 and the NLD 104.

With the active techniques, at least one of the PLC devices in the PLC network 100 is transmitting and the NLD detection unit 103 determines one or more electrical signatures. In this example, the NLD detection unit 103 determines an electrical signature and infers the presence and identity of the NLD 104 using the electrical signature. Using the active techniques, conducted as well as the radiated emissions from an NLD can be determined at an intermodulation frequency. Also, the output power of the higher order harmonics and intermodulation tones typically varies monotonically with the power of the signal input into an NLD. The active techniques are unidirectional as the radiated emissions generated by an NLD are a function of the electrical distance between the NLD and a PLC device. For example, the radiated emissions generated when the PLC device 102 transmits to the PLC device 106 may be different than the radiated emissions generated when the PLC device 106 transmits to the PLC device 102, assuming the distance between the PLC device 102 and the NLD 104 is different than the distance between the PLC device 106 and the NLD 104. In some embodiments, the NLD detection unit 103 and the NLD detection unit 107 separately estimate the distance of the NLD 104 for each direction of the communication link between the pair of PLC devices 102 and 106. The active techniques also allow detection of an NLD in high noise and high path loss situations. Examples of the active techniques include a loopback self-test and a pass-through test. In the loopback self-test, a PLC device transmits a test signal and monitors the power line for out-of band signals (as described below in FIG. 2). In the pass-through test, a PLC device monitors a power line for out-of-band signals when another PLC device in a PLC network is transmitting (as described below in FIG. 3).

Figure 2:
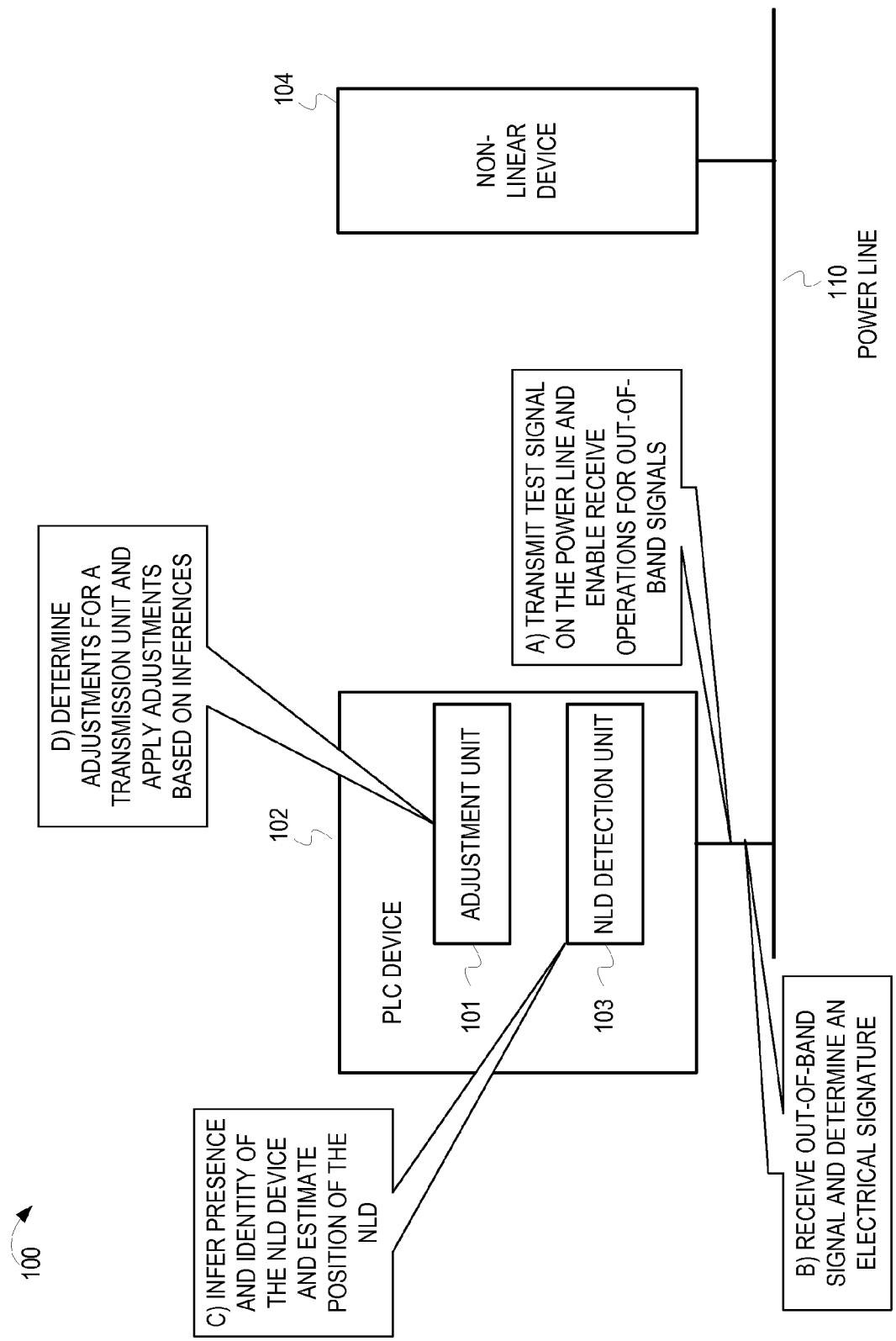
FIG. 2 depicts an example conceptual diagram of a loopback self-test to infer presence of an NLD in a PLC network.

FIG. 2 depicts an example conceptual diagram of a loopback self-test to infer presence of an NLD in a PLC network. FIG. 2 includes the PLC device 102, the power line 110, and the NLD 104, as described above with reference to the PLC network 100 in FIG. 1. In one implementation of the loopback self-test, the PLC device 102 transmits a test signal on the power line 110 and monitors the power line 110 for out-of-band signals generated due to the presence of the NLD 104. For simplification, FIG. 2 does not include the PLC device 106. FIG. 2 depicts the operations for the loopback self-test in a sequence of stages A-D.

At stage A, the PLC device 102 transmits a test signal on the power line 110 and enables receive operations for out-of-band signals (i.e., signals outside the PLC frequency band). In one implementation, the NLD detection unit 103 can instruct a transmit unit in the PLC device 102 to transmit a test signal in the PLC frequency band. The test signal may have equal or unequal power levels at different carrier frequencies. The NLD detection unit 103 may also instruct a receive unit in the PLC device 102 to enable receive operations for the out-of-band signals. For example, the NLD detection unit 103 can instruct an analog-to-digital (ADC) converter in the receive unit of the PLC device 102 to detect or capture the out-of-band signal. The out-of-band signal may be filtered by a band-pass filter in order to minimize quantization loss.

At stage B, the NLD detection unit 103 receives an out-of-band signal and determines an electrical signature using the received out-of-band signal. The NLD detection unit 103 can detect the voltages and currents at frequencies outside the PLC frequency band. The NLD detection unit 103 can also determine the PSD of the out-of-band signal. For example, the NLD detection unit 103 can determine the power levels at different frequencies present in the out-of-band signal.

At stage C, the NLD detection unit 103 infers presence and identity of the NLD 104, and estimates position of the NLD 104 with respect to the PLC device 102. In one implementation, the NLD detection unit 103 infers identity of the NLD 104 by searching electrical signatures of known devices from a lookup table stored in the PLC device 102 for one similar to the determined electrical signature. For example, the NLD detection unit 103 can infer identity of the NLD 104 using electrical characteristics of the signal received on the power line 110 after transmission of the test signal. The NLD detection unit 103 searches a lookup table for electrical characteristics at least similar to the electrical characteristics of the received signal, presumably from the NLD 104. The NLD detection unit 103 can then infer identity of the NLD 104 (e.g., identify the NLD 104 as an electric motor) when the voltage and current characteristics of the captured signal match, within an acceptable threshold, with voltage and current characteristics of a device (e.g., the electric motor) stored in the lookup table. In some implementations, the NLD detection unit 103 can infer identity of the NLD 104 using the PSD of the out-of-band signal received at stage B. The NLD detection unit 103 may also estimate the position of the NLD 104 by averaging received signal strength of the out-of-band signal. For example, the NLD detection unit 103 can estimate the distance of the NLD 104 from the PLC device 102 by comparing the received signal strength of the out-of-band signal against an expected received signal strength that is based, at least partly, on the attenuation characteristics of the power line 110, which were determined in advance.

At stage D, the adjustment unit 101 determines adjustments for a communication unit in the PLC device 102 using the inferences and applies the adjustments. In one implementation, the adjustment unit 101 determines adjustments for transmit power levels of a transmitter in the communication unit of the PLC device 102. For example, the adjustment unit 101 determines the adjustments using the inferred identity of the NLD 104. For example, when the NLD detection unit 103 infers the presence of the NLD 104 and infers the NLD 104 to be an electric motor, the adjustment unit 101 can determine adjustments for the transmit power levels at certain carrier frequencies to mitigate the effects of intermodulation or higher order harmonics that would be injected into the power line by an electric motor. In some implementations, the adjustment unit 101 can utilize the PSD of the out-of-band signal determined by the NLD detection unit 103 at stage B. For example, the adjustment unit 101 can determine the amount by which power levels should be reduced in the transmitter to avoid intermodulation and higher order harmonics at certain frequencies. The adjustment unit 101 can also utilize the position estimates of the NLD 104 to determine the adjustments (e.g., the amount of power level to be reduced) using the estimated distance of the NLD 104 from the PLC device 102, and apply the adjustments.

In some implementations, the NLD detection unit 103 may instruct the transmit unit in the PLC device 102 to gradually raise the PSD of the transmit signal (e.g., in steps of 5 to 10 dBs) and detect the out-of-band signal component by performing a power sweep test. The NLD detection unit 103 can utilize the power sweep test to identify the gain characteristics of an NLD and the inferred identity of the NLD. For example, when the out-of-band signal on the logarithmic scale increases at a rate of 20 dB per decade increase in the injected power of an in-band signal (i.e., a signal inside the PLC frequency band), the NLD detection unit 103 can infer that a fluorescent lamp is present. The NLD detection unit 103 can further determine that the intermodulation effects are due to second order intermodulation and harmonics when the out-of-band signal increases at a rate of 20 dB per decade increase in the injected in-band power. Similarly, when the out-of-band signal increases at a rate of 30 dB per decade increase in injected power of the in-band signal, the NLD detection unit 103 can determine that the intermodulation effects are due to third order intermodulation and harmonics.

Figure 3:
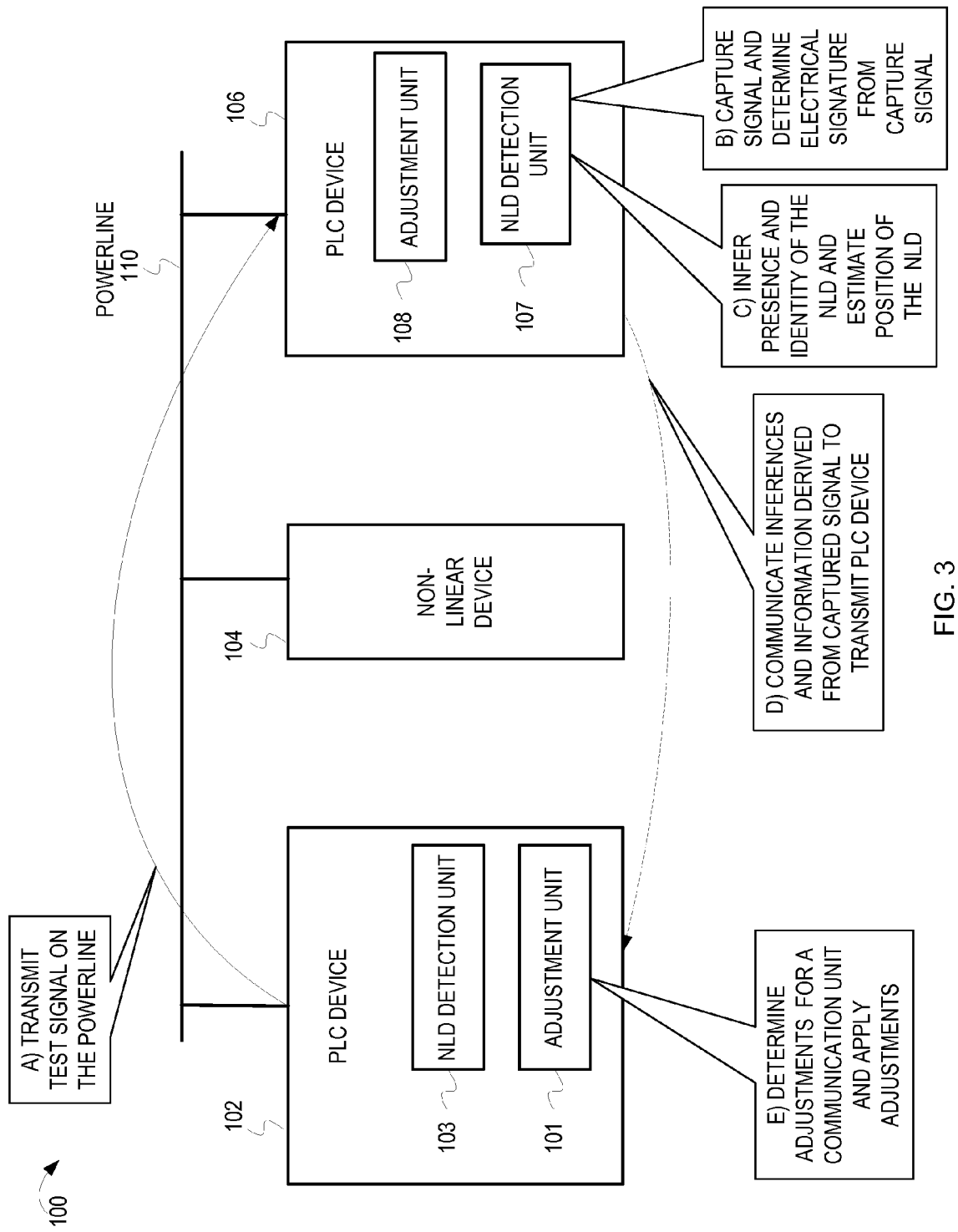
FIG. 3 depicts an example conceptual diagram of a pass-through test to infer presence of an NLD in a PLC network.

FIG. 3 depicts an example conceptual diagram of a pass-through test to infer presence of an NLD in a PLC network. FIG. 3 includes the PLC device 102, the PLC device 106, the power line 110 and the NLD 104 as described above with reference to the PLC network 100 in FIG. 1. FIG. 3 depicts the operations for the pass-through test in a sequence of stages A-E.

At stage A, the PLC device 102 transmits a test signal on the power line 110. The NLD detection unit 103 can instruct a transmit unit in the PLC device 102 to transmit the test signal. For example, the NLD detection unit 103 may instruct the transmit unit to transmit the test signal having equal or unequal power levels at different carrier frequencies. In some embodiments, the test signal encodes an indication that allows the receiving PLC device to identify the received signal as a test signal. In some embodiments, a transmitting PLC device informs one or more receiving PLC devices in advance that a test signal will be sent.

At stage B, the NLD detection unit 107 in the PLC device 106 determines an electrical signature that corresponds to the NLD 104. For example, the NLD detection unit 107 captures a signal on the power line 110 and determines an electrical signature using the captured signal. The captured signal by the PLC device 106 will reflect the effects of traversing the NLD 104. In this illustration, the NLD detection unit 107 detects the voltage and current values output by the NLD 104. The NLD detection unit 107 can also determine the PSD of an out-of-band signal generated as a consequence of the test signal traversing the NLD 104. For example, the NLD detection unit 107 can determine the power levels at different frequencies present in the out-of-band signal.

At stage C, the NLD detection unit 107 infers presence and identity of the NLD 104 and estimates position of the NLD 104 with respect to the PLC device 106. The NLD detection unit 107 infers presence of the NLD 104 using the captured signal. The NLD detection unit 107 can infer identity of the NLD 104 by searching electrical signatures of known NLD devices from a lookup table stored in the PLC device 106. For example, the NLD detection unit 107 can determine an electrical signature from the captured signal using voltage and/or current characteristics of the captured signal. The NLD detection unit 107 can search the lookup table for voltage and/or current characteristics of a device most similar to those of the captured signal. The NLD detection unit 107 can then infer identity of the NLD 104 (e.g., infer identity of the NLD 104 as an AC adapter) when the voltage and/or current characteristics of the captured signal are most similar to those stored in the lookup table for an AC adapter. The NLD detection unit 107 may also estimate the position of the NLD 104 by averaging received signal strength of signals received by the PLC device 106. For example, the NLD detection unit 107 can estimate the electrical distance of the NLD 104 from the PLC device 106 using the test signal transmitted by the PLC device 102, the inferred identity of the NLD 104, the attenuation characteristics of the power line 110, and the received signal strength of signals received by the PLC device 106. The NLD detection unit 107 can estimate the electrical distance of the NLD 104 from the PLC device 106 based on degradation in signal strength of the signals received over the power line 110 since the PLC device 106 is aware of the transmit signal strength of other PLC devices in the PLC network 100. In some embodiments, the NLD detection unit 107 can also estimate the electrical distance of the NLD 104 from the PLC device 102 using the estimated distance of the NLD 104 from the PLC device 106, and the distance between the PLC devices 102 and 106.

At stage D, the PLC device 106 communicates the information inferred about the NLD 104 and information about the detected signals to the PLC device 102. A communication unit in the PLC device 106 can communicate the information to the PLC device 102. The information may include the identity of the NLD (e.g., device model number, category of device, type of device, etc.), position estimate of the NLD 104, the PSD of the out-of-band signal, etc.

At stage E, the adjustment unit 101 determines adjustments for a communication unit in the PLC device 102 from the pass-through test and applies the adjustments. The adjustment unit 101 can determine adjustments for transmit power levels of a transmitter in the communication unit from the pass-through test. For example, the adjustment unit 101 utilizes the information received from the PLC device 106 (at stage D) to determine the adjustments. In some implementations, the adjustment unit 101 determines the adjustments using the inferred identity of the NLD. For example, when the NLD detection unit 107 identifies the NLD 104 as a particular power tool, the adjustment unit 101 can determine adjustments for the transmit power levels at certain carrier frequencies which may lead to intermodulation or higher order harmonics by the particular power tool. In some implementations, the adjustment unit 101 can utilize the PSD of the out-of-band signal determined at stage B by the NLD detection unit 107. For example, the adjustment unit 101 can determine the amount by which power levels should be reduced in the transmitter to avoid intermodulation and higher order harmonics at certain carrier frequencies. The adjustment unit 101 can also utilize the position estimates of the NLD 104 to determine the adjustments (e.g., the amount of power level to be reduced) using the distance of the NLD 104 from the PLC device 102, and apply the adjustments.

Stages A-E, illustrate the pass-through test when the PLC device 102 transmits a test signal. It is noted that in a similar manner, the PLC device 106 can transmit a test signal and the NLD detection unit 103 in the PLC device 102 can determine electrical signatures of signals that traverse the NLD 104, infer identity of the NLD 104 using an electrical signature, determine the PSD of out-of-band signals, determine position estimates of the NLD 104, and communicate the inferences and information derived from detected signals to the PLC device 106. The adjustment unit 108 in the PLC device 106 can determine adjustments for the communication unit in the PLC device 106 and apply the adjustments.

Figure 4:
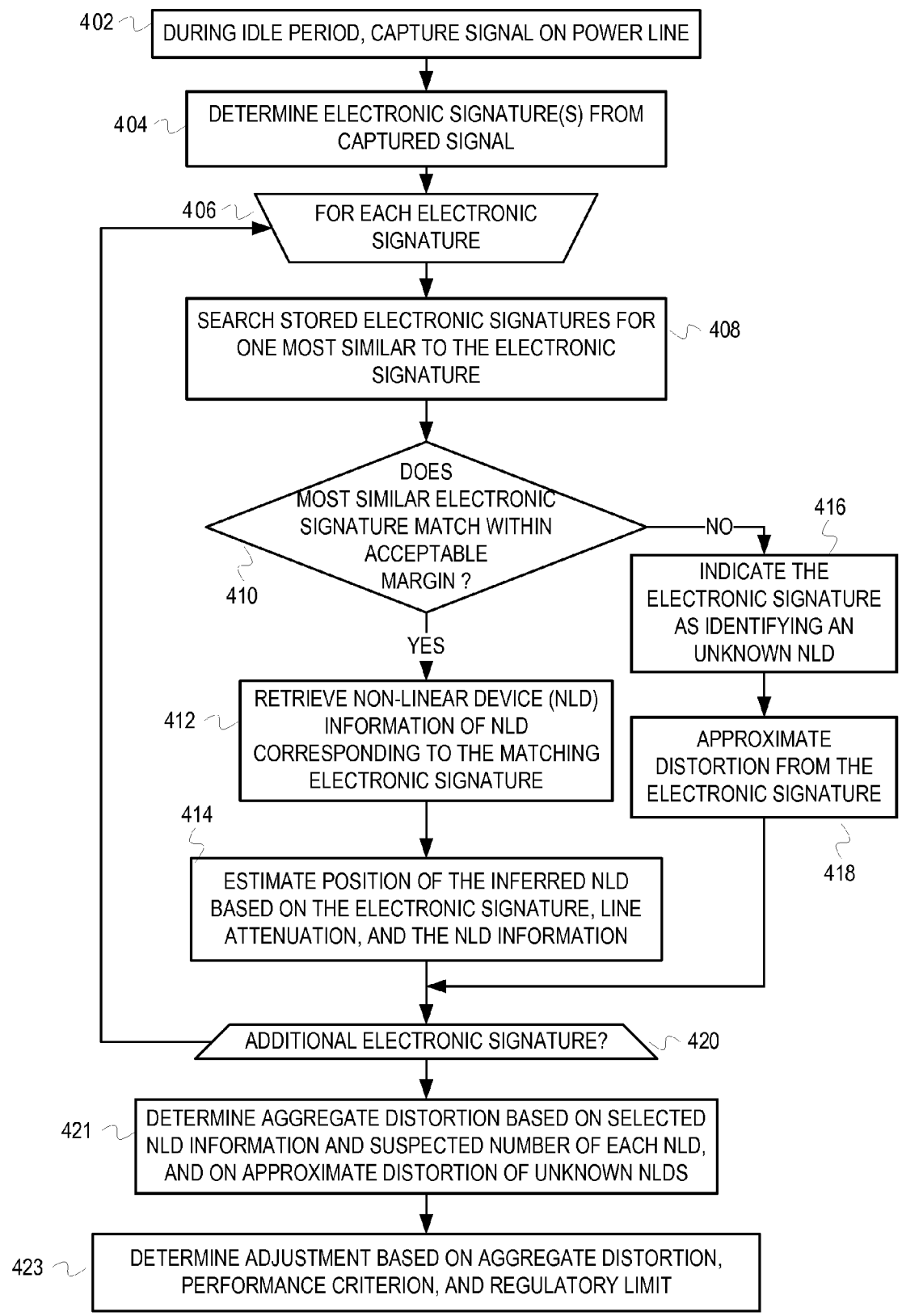
FIG. 4 illustrates a flow diagram of example operations for inferring presence and identity of NLDs on a power line during an idle period.

FIG. 4 illustrates a flow diagram of example operations for inferring presence and identity of NLDs on a power line during an idle period. The depicted operations are example operations and should not be used to limit embodiments of the inventive subject matter or the scope of the claims.

At block 402, a signal is captured on a power line of a powerline communication network during an idle period. The idle period is a period of time during which PLC devices on the PLC network are not transmitting. This idle period can be a predefined period in accordance with a protocol or agreed upon by the PLC devices. To capture the signal during the idle period, a PLC device can turn off its transmit port and turn on its receive port. Capturing the signal involves sampling the voltage (or current) as a function of time. Voltage (or current) can be measured at various points of the PLC device depending upon the PLC device. For instance, the signal can be measured at anywhere between one to four measurement ports simultaneously. Possible measurement ports are Line with respect to Neutral, Line with respect to Protective Earth, Neutral with respect to Protective Earth, and the common-mode which is a measure of the net voltage that flows through all of the conductors. A single port single input single output (SISO) PLC device can sample the analog-to-digital (A/D) converter input from the Line-Neutral port. A two port multiple input multiple output (MIMO) PLC device can sample the A/D inputs from the Line with respect to Neutral and the Line with respect to Protective Earth ports.

A PLC device measures voltage (or current) for a period of time which is at least long enough to sample all of the phases of the AC line cycle where the NLDs generate their maximum amount of distortion/interference. To sample these phases of the AC line cycle, a PLC device can sample continuously for at least a single period of the AC line cycle (16.7 ms for 60 Hz, or 20 ms for 50 Hz). A PLC device can alternatively sample for multiple periods of the AC line cycle in order to get a better averaging of the interference from the NLD(s) as a function of the AC line cycle's phase. Sampling for multiple periods of the AC line cycle also allows the PLC device to account for the intermittent NLD interference due to the NLD, or when NLD interference is occasionally hidden beneath impulsive noise and interference from other sources. For example, a PLC device can sample the power line for about 100 milliseconds (ms) to 500 ms.

A PLC device can also account for pulsing NLDs by sampling continuously over one or more periods of the AC line cycle. The PLC device could identify the pulsing characteristic by inspecting the received interference as a function of time. Most likely, the periodicity of the pulsing would be related to the AC line cycle period. A PLC device, however, can sample the power line in a manner that detects periods of pulsing which are shorter than or longer than a single AC line cycle period. Due to the potential presence of higher order harmonics, the PLC device can sample the power line to track pulsing that may be present at integer multiples of the AC line cycle frequency.

At block 404, one or more electronic signatures are determined from the captured signal. After sampling the power line, one or more electronic signatures can be computed using measurements of different characteristics of the captured signal. For instance, the electronic signature can be computed and stored as a reading of voltage versus time. As another example, the electronic signature could be stored as a two-dimensional voltage versus time and frequency measurement, which is similar in concept to a spectrogram. The granularity of the time axis could be fairly coarse. For instance the AC line cycle could be divided into several segments of a few milliseconds each. The granularity of the frequency axis depends upon the sampling rate and the Fast Fourier Transform (FFT) size. For PLC devices which employ Orthogonal Frequency Division Multiplexing (OFDM), the frequency axis granularity could, for instance, be set to the inter-carrier spacing of the OFDM modulation used by the PLC device (e.g., 24.414 kHz for the HomePlug AV modems). The origin of the time axis could, for instance, be referenced to the start of the AC line cycle period. It could also be referenced relative to the timing provided by a physical layer synchronization protocol, such as the Intersystem Protocol (ISP) from the IEEE 1901 standard.

To determine whether a captured signal comprises multiple electronic signatures (i.e., infer presence of multiple NLDs), a PLC device can process the captured signal in different domains to isolate the different electronic signatures. A PLC device can use frequency-domain spectrum processing techniques to isolate multiple electronic signatures and infer multiple NLDs that may be active contemporaneously and/or simultaneously. For example, a PLC device can utilize a two-dimensional time and frequency map, synchronized to the AC line cycle. The two-dimensional time and frequency map, such as that obtained using a spectrogram, may allow the PLC device to infer presence of multiple NLDs which operate in non-overlapping or partially overlapping time and frequency regions, and determine multiple corresponding electronic signatures. As another example, a PLC device can use cross-correlation of two captured signals to determine multiple electronic signatures. The PLC device can process the two signals as represented in the frequency domain using cross-correlation. If the PLC device discovers multiple cross-correlation peaks, then the PLC device can infer that multiple NLDs are likely present. In yet another example, a PLC device can store frequency domain representations of NLD spectrums, and then compare them against a frequency domain spectrum of the captured signal. The PLC device can compute the frequency domain of the captured signal using Welch's power spectral density estimate. If the NLD spectrums have local peaks at different frequencies and if the captured signal's spectrum has multiple peaks, then the PLC device can infer that multiple NLDs are present.

As stated earlier, the electronic signature can comprise other parameters in addition to voltage and frequency. The electronic signature can be characterized with other parameters that could include any one or more of the average received power level, the peak to average power level, mean value of a waveform (i.e., DC offset), voltage envelope, estimates of the intermodulation characteristics, estimates of the physical distance or electrical distance between a PLC device and an NLD, and higher order metrics on the voltage measurements such as the variance (second central moment). In addition, a power spectral density can be computed to represent the electronic signature or as one parameter of an electronic signature. The power spectral density (PSD), typically measured in units such as Watts/Hz or dBm/Hz, is a plot of the power of the signal as a function of the frequency. Since the PSD is the signal magnitude without the phase component and the number of elements in the PSD spectrum table can be fewer than the number of time domain samples, the PSD can be a more compact representation than the original sampled time domain signal.

At block 406, a loop of operations begins for each determined electronic signature.

At block 408, stored electronic signatures (also referred to as known electronic signatures) are searched for one that is most similar to the determined electronic signature. Assuming a multi-parameter electronic signature, the searching can traverse the stored electronic signatures comparing all parameters of a stored electronic signature against all parameters of the determined electronic signature. Alternatively, the searching can iteratively compare each parameter of each stored electronic signature against each parameter of the determined electronic signature and eliminate stored electronic signatures as matches when any one of the parameters fails to match within a margin. In some cases, the determined electronic signature will have different parameters than the stored electronic signatures. For instance, the determined electronic signature may be characterized by voltage over time and frequency and average received power level. The stored electronic signatures may be characterized by voltage envelope and DC offset. Embodiments can require a threshold number of corresponding parameters to match signatures. Embodiments can specify particular parameters that must match within a margin and allow other parameters as optional or for refinement of matching.

At block 410, it is determined whether the most similar known electronic signature matches the determined electronic signature within an acceptable margin. Most likely, the determined electronic signature will not identically match any one of the stored electronic signatures for a variety of reasons (e.g., line attenuation, other noise injectors, etc.). Therefore, margins can be defined to allow flexibility and practicality in signature matching. If no stored electronic signature matches the determined electronic signature within the acceptable margin, then control flows to block 416. Otherwise, control flows to block 412.

At block 412, information for an NLD corresponding to the matching electronic signature is retrieved. Examples of the NLD information include measurements of power levels and intermodulation effects of the NLD. These measurements may have been taken in a lab, may have been taken by the manufacturer of the NLD, may be field measurements taken under different environmental conditions, etc. In addition, the granularity of the information for an NLD can vary. Instead of being at the device level, the information can be at the element level. For instance, information for an NLD may be composed of individual measurements of non-linear elements in the NLD. The PLC device updates data that it maintains which indicates perceived topology of the PLC network. The PLC device can maintain data that indicates, literally or referentially, the inferred NLD identity using the matching signature. The PLC device can associate either or both of the determined electronic signature and the matching known electronic signature with the inferred NLD.

At block 414, position of the inferred NLD is estimated using the electronic signature, previously discovered/estimated line attenuation, and the NLD information. In the passive technique, a PLC device can estimate position of an inferred NLD using measured signal strength of a received out-of-band signal. In some embodiments, a PLC device measures signal strength of both in-band and out-band frequencies, and estimates position of an inferred NLD using the measured signal strengths of both. The PLC device updates the perceived PLC network topology with the estimated position. For instance, the PLC device associates the estimated position with an entry for the corresponding inferred NLD in the perceived PLC network topology.

At block 420, it is determined whether there are additional electronic signatures determined from the captured signal. If so, control returns to block 406 for processing of the next determined electronic signature. Otherwise, control flows to block 421.

If there is no matching electronic signature, then control flows to block 416 from block 410. At block 416, the electronic signature is indicated as identifying an unknown NLD. An entry can be created in the same structure that hosts the known electronic signatures, or a separate structure can store information for unknown NLDs. Creating profiles for unknown NLDs allows PLC devices to adjust to their particular deployment environment. Every possible NLD may not be indicated in the store of known electronic signatures. To reduce the memory requirements for storing information about an NLD and to improve performance, a PLC device may apply a frequency domain (FD) spectrum processing technique (e.g., Welch's method) to the sampled time domain waveforms of the electronic signature prior to storage.

At block 418, distortion from the electronic signature of the unknown device is approximated. The impact of the unknown NLD is estimated based on observed radiated emissions corresponding to the determined electronic signature. Since the impact of unknown NLD is estimated using the determined electronic signature instead of information obtained from lab or field measurements, adjustments to mitigate the effects of the unknown NLD can be computed with a more conservative approach. For example, the power level adjustment for an unknown NLD with estimated distortion similar to a known NLD may be lower than the power level adjustment for the known NLD. Control flows from block 418 to block 420.

At block 421, an aggregate distortion is determined using the selected NLD information and suspected number of each type of NLD, the estimated positions of the NLDs, and the approximate distortion of unknown NLDs.

At block 423, a transmit power adjustment is determined using the aggregate distortion, a performance criterion, and a regulatory limit. One or more performance criteria may be defined for a PLC device. For example, the PLC device may be required to satisfy a minimum throughput performance criterion. The limit may be a regulatory or standard limit that is defined or accessible by the PLC device. The transmit power adjustment would satisfy all of the performance criterion and the limit. If the radiated emissions due to the NLD are monotonically related to the power of the PLC signal level received at the NLD input, then the impact to the radiated emissions may be the greatest when the PLC device transmitter is electrically close to the NLD. If an NLD identity is inferred, then the PLC device transmitter power can be reduced using the NLD type and the electrical distance between the NLD and the PLC device, the estimated NLD gain, and any other parameters which affect the radiated emissions. When a PLC device infers presence of multiple NLDs, the PLC device can determine transmit power adjustment with a non-linear function which applies a greater weight on the electrically nearest NLD. The non-linear function can use information only about the inferred nearest NLD and discard the rest, can assign weights to each inferred NLD based on individual electrical distances, etc. As an example of using individual distances to determine adjustment for multiple intervening NLDs, a PLC device can estimate distance for determining the adjustment as a length of an n-dimensional vector (i.e., $d1^2+d2^2+\ldots dn^2$), where do is the estimated distance of the nth inferred NLD from the PLC. The weighing based, at least partly, on estimated proximity can be used to map to the expected impact of the radiated emissions, and guide the corresponding adjustment to the PLC device's transmit power. Due to channel reciprocity and the non-linear manner in which intermodulation amplifies an input signal, proximity of an inferred NLD to a PLC device and PLC device transmit power can inform expected radiated emissions. With active techniques, the actual conducted power levels are measured at the transmit PLC device and/or receive PLC device, which can give further insight into the expected radiated emissions. Rules can be defined that indicate a degree to which transmit power is to be scaled based, at least in part, on estimated distance of an inferred NLD to the PLC device. For instance, a table can associate ranges of electrical distance with a scaled value.

Figure 5:
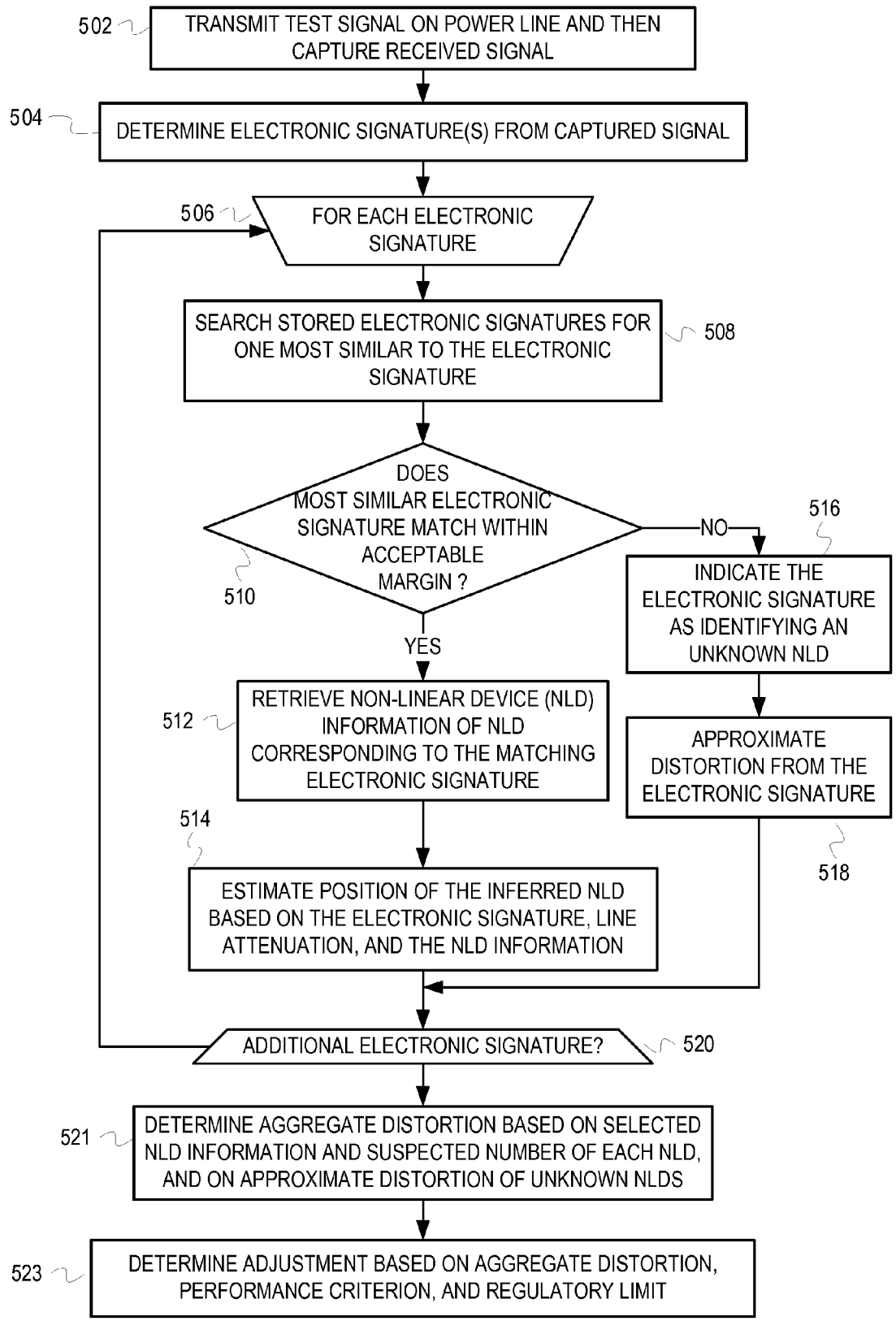
FIG. 5 illustrates a flow diagram of example operations to infer presence and identity of NLDs in the powerline communication network with a test signal transmitted by a PLC device.

FIG. 5 illustrates a flow diagram of example operations to infer presence and identity of NLDs in the powerline communication network with a test signal transmitted by a PLC device. The operations depicted in FIG. 5 are similar to those depicted in FIG. 4.

At block 502, a test signal is transmitted on a power line and a received out-of-band signal is captured. The test signal is representative of the PLC signal which would be generated by a PLC device for messaging and data communications purposes. For instance, the HomePlug AV modems use OFDM modulation with 24.414 kHz inter-carrier spacing. So, the test signal could be generated by taking an IFFT of random M-ary Phase-Shift Keying (MPSK) or quadrature amplitude modulation (QAM) modulated tones which are given the appropriate voltage scaling to achieve the transmit power spectral density. The test signal covers the same frequency range as the underlying powerline communication standard. For example, for the HomePlug AV 1.1 standard, the frequency range of 2 MHz to 30 MHz could be generated by employing a 3072 point IFFT at a 75 million samples per second (Msps) sampling rate. In order to deepen the spectral notches in the amateur radio and other licensed radio frequency bands, time domain overlap and tapering of the OFDM symbols can also be done. To examine all regions of the AC line cycle, the PLC device's test signal could consist of 1 millisecond to 2 millisecond long packets generated by multiple consecutive OFDM symbols. These packets can repeat with a high duty cycle (e.g., >=80%).

While transmitting the test signal, the transmitting PLC device captures out-of-band signals (i.e., signals outside of the PLC frequency band). Measurement/capture of the out-of-band signals involves sampling voltage (or current) as a function of time, converting the measurement to the frequency domain, and filtering out the PLC frequency range. Voltage (or current) can be measured at various points of the PLC device depending upon the PLC device. For instance, the signal can be measured at anywhere between one to four measurement ports simultaneously. Possible measurement ports are Line with respect to Neutral, Line with respect to Protective Earth, Neutral with respect to Protective Earth, and the common-mode which is a measure of the net voltage that flows through all of the conductors. A SISO PLC device can sample the A/D converter input from the Line-Neutral port. A two port MIMO PLC device can sample the A/D inputs from the Line with respect to Neutral and the Line with respect to Protective Earth ports.

A PLC device measures voltage (or current) for a period of time which is at least long enough to sample all of the phases of the AC line cycle where the NLDs generate their maximum amount of distortion/interference. To sample these phases of the AC line cycle, a PLC device can sample continuously for at least a single period of the AC line cycle (16.7 ms for 60 Hz, or 20 ms for 50 Hz). A PLC device can alternatively sample for multiple periods of the AC line cycle in order to get a better averaging of the interference from the NLD(s) as a function of the AC line cycle's phase. Sampling for multiple periods of the AC line cycle also allows the PLC device to account for the intermittent NLD interference due to the NLD, or when NLD interference is occasionally hidden beneath impulsive noise and interference from other sources. For example, a PLC device can sample the power line for about 100 milliseconds (ms) to 500 ms.

A PLC device can also account for pulsing NLDs by sampling continuously over one or more periods of the AC line cycle. The PLC device could identify the pulsing characteristic by inspecting the received interference as a function of time. Most likely, the periodicity of the pulsing would be related to the AC line cycle period. A PLC device, however, can sample the power line in a manner that detects periods of pulsing which are shorter than or longer than a single AC line cycle period. Due to the potential presence of higher order harmonics, the PLC device can sample the power line to track pulsing that may be present at integer multiples of the AC line cycle frequency.

In addition, a PLC device can transmit a test signal in accordance with the previously described sweep test. The PLC device increases the PSD of the test signal in steps and analyzes any out-of-band signal to detect non-linear amplification, which is indicative of an NLD.

At block 504, one or more electronic signatures are determined from the captured signal. After sampling the power line, a number of electronic signatures and the electronic signature can be computed using measurements of different characteristics of the captured signal. For instance, the electronic signature can be computed and stored as a reading of voltage versus time. As another example, the electronic signature could be stored as a two-dimensional voltage versus time and frequency measurement, which is similar in concept to a spectrogram. The granularity of the time axis could be fairly coarse. For instance the AC line cycle could be divided into several segments of a few milliseconds each. The granularity of the frequency axis depends upon the sampling rate and the Fast Fourier Transform (FFT) size. The frequency axis granularity could, for instance, be set to the inter-carrier spacing of the PLC device (e.g., 24.414 kHz for the HomePlug AV modems). The origin of the time axis could, for instance, be referenced to the start of the AC line cycle period. It could also be referenced relative to the timing provided by a physical layer synchronization protocol, such as the Intersystem Protocol (ISP) from the IEEE 1901 standard.

To determine whether a captured signal comprises multiple electronic signatures (i.e., infer presence of multiple NLDs), a PLC device can process the captured signal in different domains to isolate the different electronic signatures. A PLC device can use frequency-domain spectrum processing techniques to isolate multiple electronic signatures and infer multiple NLDs that may be active contemporaneously and/or simultaneously. For example, a PLC device can utilize a two-dimensional time and frequency map, synchronized to the AC line cycle. The two-dimensional time and frequency map, such as that obtained using a spectrogram, may allow the PLC device to infer presence of multiple NLDs which operate in non-overlapping or partially overlapping time and frequency regions, and determine multiple corresponding electronic signatures.

As stated earlier, the electronic signature can comprise other parameters in addition to voltage and frequency. The electronic signature can be characterized with other parameters that could include any one or more of the average received power level, the peak to average power level, mean value of a waveform (i.e., DC offset), voltage envelope, estimates of the intermodulation characteristics, estimates of the physical distance or electrical distance between a PLC device and an NLD, and higher order metrics on the voltage measurements such as the variance (second central moment). In addition, a power spectral density can be computed for the electronic signature.

At block 506, a loop of operations begins for each determined electronic signature.

At block 508, stored electronic signatures (also referred to as known electronic signatures) are searched for one that is most similar to the determined electronic signature. Assuming a multi-parameter electronic signature, the searching can traverse the stored electronic signatures comparing all parameters of a stored electronic signature against all parameters of the determined electronic signature. Alternatively, the searching can iteratively compare each parameter of each stored electronic signature against each parameter of the determined electronic signature and eliminate stored electronic signatures as matches when any one of the parameters fails to match within a margin. In some cases, the determined electronic signature will have different parameters than the stored electronic signatures. For instance, the determined electronic signature may be characterized by voltage over time and frequency and average received power level. The stored electronic signatures may be characterized by voltage envelope and DC offset. Embodiments can require a threshold number of corresponding parameters to match signatures. Embodiments can specify particular parameters that must match within a margin and allow other parameters as optional or for refinement of matching.

At block 510, it is determined whether the most similar known electronic signature matches the determined electronic signature within an acceptable margin. Most likely, the determined electronic signature will not identically match any one of the stored electronic signatures for a variety of reasons (e.g., line attenuation, other noise injectors, intermittent environmental noise, etc.). Therefore, margins can be defined to allow flexibility and practicality in signature matching. If no stored electronic signature matches the determined electronic signature within the acceptable margin, then control flows to block 516. Otherwise, control flows to block 512.

At block 512, information for an NLD corresponding to the matching electronic signature is selected.

At block 514, position of the inferred NLD is estimated using the electronic signature, discovered line attenuation, and the NLD information.

At block 520, it is determined whether there are additional electronic signatures determined from the captured signal. If so, control returns to block 506 for processing of the next determined electronic signature. Otherwise, control flows to block 521.

If there was no matching electronic signature, then control flows to block 516 from block 510. At block 516, the electronic signature is indicated as identifying an unknown NLD. An entry can be created in the same structure that hosts the known electronic signatures, or a separate structure can store information for unknown NLDs. Creating profiles for unknown NLDs allows PLC devices to adjust to their particular deployment environment. Every possible NLD may not be indicated in the store of known electronic signatures. To reduce the memory requirements for storing information about an NLD and to improve performance, a PLC device may apply a frequency domain (FD) spectrum processing technique (e.g., Welch's method) to the sampled time domain waveforms of the electronic signature prior to storage.

At block 518, distortion from the electronic signature of the unknown device is approximated. Control flows from block 518 to block 520.

At block 521, an aggregate distortion is determined using the selected NLD information and suspected number of each type of NLD, the estimated positions of the NLDs, and the approximate distortion of unknown NLDs.

At block 523, a transmit power adjustment is determined using the aggregate distortion, a performance criterion, and a regulatory limit. One or more performance criteria may be defined for a PLC device. For example, the PLC device may be required to satisfy a minimum throughput performance criterion. The limit may be a regulatory or standard limit that is defined or accessible by the PLC device, and there can be more than one limit. The transmit power adjustment would satisfy all of the performance criterion and the limit. If the radiated emissions due to the NLD are monotonically related to the power of the PLC signal level received at the NLD input, then the impact to the radiated emissions may be the greatest when the PLC device transmitter is electrically close to the NLD. If an NLD identity is inferred, then the PLC device transmitter power can be reduced using the NLD type and the electrical distance between the NLD and the PLC device, the estimated NLD gain, and any other parameters which affect the radiated emissions. When a PLC device infers presence of multiple NLDs, the PLC device can determine transmit power adjustment with a non-linear function which applies a greater weight on the electrically nearest NLD. The weighing based, at least partly, on estimated proximity can be used to map to the expected impact to the radiated emissions, and guide the corresponding adjustment to the PLC device's transmit power.

The operations depicted in FIG. 5 are example operations for implementing the active loop-back test for inferring presence and identity of NLDs. Example operations for the active pass-through test can be similar to those depicted in FIG. 5. Instead of the transmitting PLC device capturing a signal, a receive PLC device will capture a signal corresponding to the transmitted test signal. Due to the attenuation between the transmit PLC device and the receive PLC device, the receive PLC device may capture both the in-band signal as well as the out-of-band signal components. As mentioned with respect to FIG. 3, a transmitting PLC device can encode an indicator into the test signal that allows the receiving PLC device to recognize the signal as a test signal. The transmit PLC device can also (or instead of encoding) inform the receive PLC device(s) in advance that a test signal will be transmitted. The test signal can traverse multiple paths to multiple receive PLC devices, allowing the transmitting PLC device to obtain feedback from multiple PLC receive devices that have independently measured the received version of the transmitted test signal. The multiple paths may include common segments and independent segments. For the active pass-through test, the other example operations depicted in FIG. 5 up to block 521 are performed by a receive PLC device. The receive PLC device would communicate the inferences and determined information about intervening NLDs back to the transmit PLC device. In some embodiments, the receive PLC device can determine a transmit PSD adjustment for the transmit PLC device and also communicate the adjustment to the transmit PLC device. In other embodiments, the transmit PLC device determines the adjustment using the feedback from the receive PLC device. A PLC device may reduce the entire transmit power level at the transmitting PLC device using the magnitude of detected out-of-band signals. For example, the PLC device may adjust the transmit gain either in one or more digital signal processing components of the transmitter, or one or more analog signal processing components of the transmitter. A transmit PLC device can utilize feedback from a receiving PLC device after adjusting the transmit power levels in the transmitter. This adjustment of transmit power level can be in accordance with a non-uniform step size (e.g., a binary search algorithm) to utilize the received feedback. A transmitting PLC device can also determine adjustments for the transmitter such that transmit power at certain carrier frequencies are increased in order to maximize throughput at a receiving PLC device, while limiting the expected radiated emissions to be within the regulatory limits, using feedback from a receive PLC device involved in a pass-through test. For example, the transmitting PLC device can determine values of a pair of frequencies $f_1$ and $f_2$ which may lead to radiated emissions at an intermodulation frequency $f_r$. The transmitting PLC device can assign a higher transmit PSD to those values of $f_1$ and $f_2$ which have a lower path loss to the receiving PLC device over the power line to maximize the throughput at the receiving PLC device.

Since NLD presence can be dynamic (e.g., some of the NLDs may be plugged into and removed from the electrical outlets of the PLC network, or their gain settings may be modified), a PLC device can periodically sense the powerline medium in order to obtain status updates on the NLDs which are presently coupled to the AC power line wiring. Over time the data representing the state of the PLC network (e.g., the data representing the perceived PLC network topology, data indicating NLDs previously inferred as present) could be annotated to indicate the set of NLDs which have been detected most recently by the PLC device, and the electronic signatures of these NLDs would be given searching priority in subsequent NLD detection operations. Upon power-up from the cold start state, a PLC device may also query currently active PLC devices on the same or a neighboring network in order to determine the type of NLDs for which search priority should be given.

Estimating the positions of the NLDs can be done with any individual one of the passive and active techniques, or a combination of active techniques. In addition, the information obtained can be combined with a defined network topology (e.g., data representing a wiring diagram of a deployed PLC network). With the electrical distances and the defined network topology, a PLC device can identify locations of sensed NLDs within a structure housing the PLC network. Further, a PLC device could be moved to different outlets and measurements taken at each of the outlets to sense the emissions at a number of electrical outlet locations greater than the number of available PLC devices. These measurements could be utilized for optimizing the placement of the PLC devices and NLDs to maximize electrical distance between the PLC devices and the NLDs. These measurements can also be used for identifying the locations of the NLDs which are most disruptive to the operation of the PLC network. Once the NLDs suspected of creating the most disruption have been identified, various mitigating actions can be taken. Example of corrective actions using these multiple outlet measurements include removing the highly disruptive NLDs from the powerline communication network, replacing the highly disruptive NLDs with alternative devices that provide a similar functionality with less intermodulation, and augmenting the NLDs with low pass filters that attenuate the high frequency PLC signals.

The operations depicted in the flowcharts and the conceptual diagrams are examples to aid in understanding the inventive subject matter. Embodiments can perform some operations in a different order, perform operations in parallel, perform operations differently, perform fewer operations, etc. For instance, embodiments can combine the operations of the active pass-through test and the active loop-back self-test. A transmitting PLC device can infer presence and identity (or type) of one or more NLDs using out-of-band measurements taken at the transmitting PLC device, and either or both of out-of-band and in-band measurements taken by a receiving PLC device. Embodiments can perform all of the techniques at various times to infer presence and identity of NLDs, as well as estimate NLD positions. For example, PLC devices can sense the power line in accordance with the passive technique in a round robin fashion when first establishing the PLC network. Afterwards, the active techniques can be employed. The active loopback self-test can be employed by a PLC device that is not transmitting data intended to be received at other PLC devices during the periods when data communication between PLC devices is not taking place in its vicinity. And the active-pass through test can be conducted at agreed upon intervals to avoid injecting overhead into data communications, and further refining the inferences about NLDs on the PLC network. With respect to FIGS. 4 and 5, embodiments may not create profiles or store electronic signatures for unknown NLDs. In addition, embodiments may not estimate position of NLDs as represented by blocks 414 and 514. In the case of embodiments that do not estimate position of inferred NLDs or in the case of inaccurate position estimates, other information could be used to determine adjustments.

For example, a PLC device can determine an adjustment using received signal strength, type and number of NLDs, etc.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting information ("machine-readable signal medium") in a form (e.g., software, processing application) readable by a machine (e.g., a computer). Examples of a machine-readable storage medium include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Examples of a machine-readable signal medium include electrical, optical, acoustical or other forms of propagated signals (e.g., carrier waves, infrared signals, digital signals, etc.), or wireline, wireless, or other communications media. Machine-readable storage media and machine-readable signal media are mutually exclusive types of machine-readable media. Machine-readable storage media do not include machine-readable signal media, thus machine-readable storage media do not include transitory signals.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
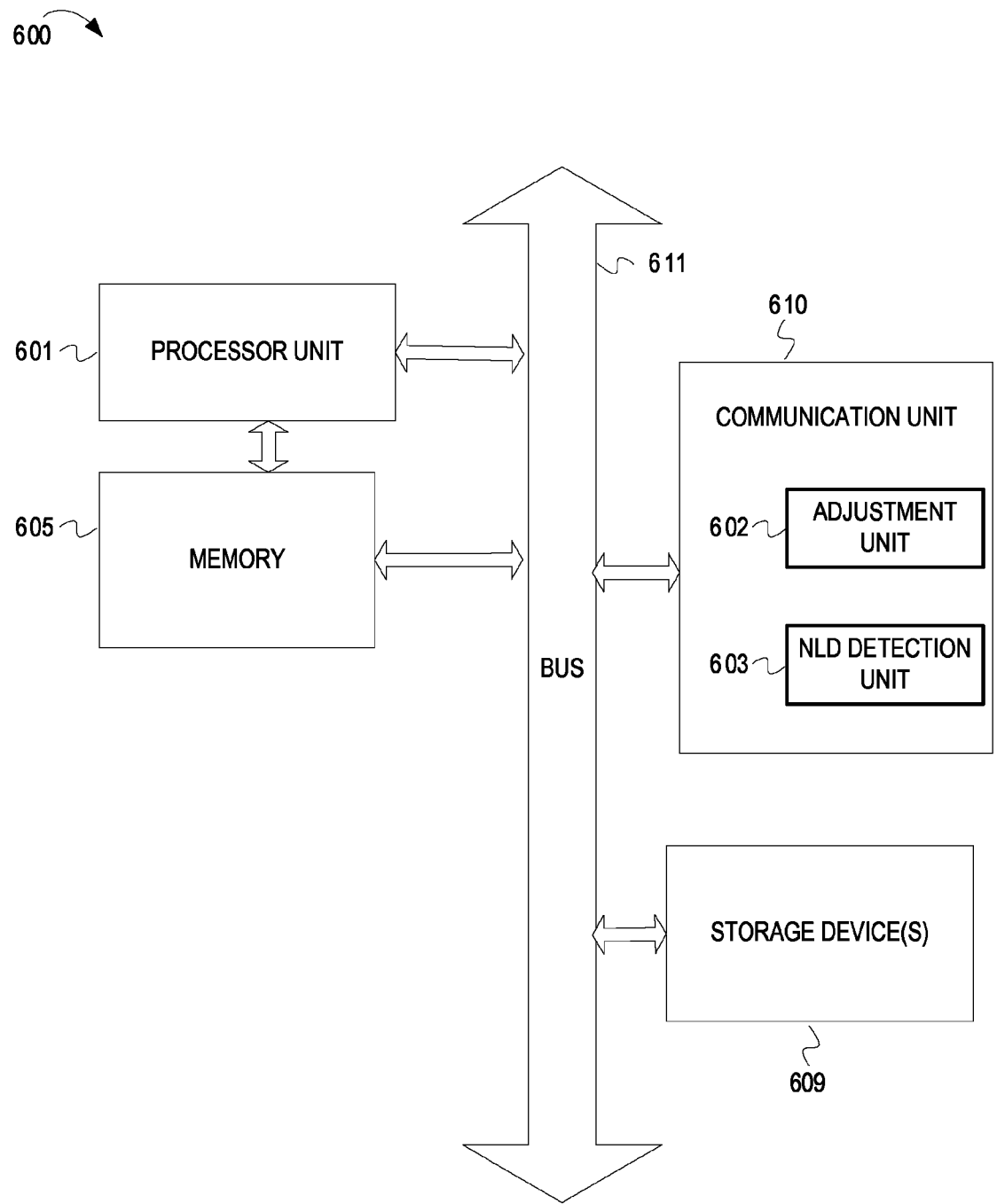
FIG. 6 depicts an example network device with an NLD detection unit that infers presence and identity of NLDs on a PLC network.

FIG. 6 depicts an example network device with an NLD detection unit that infers presence and identity of NLDs on a PLC network. In some implementations, the network device 600 may be a PLC device (e.g., a server, a television, a laptop, etc.). The PLC device 600 includes a processor unit 601 (possibly including multiple processors, multiple cores, multiple nodes, and/or implementing multi-threading, etc.). The PLC device 600 includes a memory 605. The memory 605 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The network device 600 also includes a bus 611 (e.g., PCI bus, PCI-Express bus, AHB bus, AXI protocol compliant bus, etc.), a storage device(s) 609 (e.g., optical storage, magnetic storage, network attached storage, etc.), and a communication unit 610. The communication unit 610 includes an NLD detection unit 603 and an adjustment unit 602, which is configured to implement the functionality of the embodiments described above with reference to FIGS. 1-5. The NLD detection unit 603 includes one or more functionalities that facilitate inferring presence and identity of NLDs in a PLC network. The adjustment unit 602 includes one or more functionalities that facilitate applying adjustments to a transmitter in the communication unit 610 to mitigate radiated emissions using inferences made by the NLD detection unit 603. Any one of these functionalities may be partially (or entirely) implemented in hardware. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the communication unit 610 are coupled to the bus 611. Although illustrated as being coupled to the bus 611, the memory 605 may be coupled to the processor unit 601.

While the embodiments are described with reference to various implementations and exploitations, it will be understood that these embodiments are illustrative and that the scope of the inventive subject matter is not limited to them. In general, techniques for inferring presence and identity of NLDs and applying adjustments to mitigate radiated emissions from inferred NLDs as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method comprising:
   determining a first electronic signature from a signal captured from a power line of a powerline communication network;
   inferring presence and identity of a first non-linear device on the power line based, at least in part, on the first electronic signature;
   retrieving information corresponding to the first non-linear device based at least in part, on the inferred identity of the first non-linear device; and
   determining a distortion mitigating adjustment to apply when transmitting on the power line based, at least in part, on the retrieved information, wherein the distortion mitigating adjustment comprises reducing transmit power level at one or more carrier frequencies when transmitting on the power line.

2. The method of claim 1, wherein said determining the first electronic signature from the signal captured from the power line comprises sampling at least an out-of-band signal on the power line, wherein the signal is out-of-band with respect to powerline communications.

3. The method of claim 1; further comprising determining a second electronic signature from the signal captured from the power line, wherein determining the first electronic signature and the second electronic signature from the signal captured from the power line comprises analyzing the signal in a frequency-time domain and isolating the first electronic signature and the second electronic signature based, at least in part, on said analyzing the signal in the frequency-time domain.

4. The method of claim 1, wherein said inferring presence and identity of the non-linear device on the power line based, at least in part, on the first electronic signature comprises:
determining that the first electronic signature is most similar to a first stored electronic signature of a plurality of stored electronic signatures within a defined margin of acceptable variance, wherein each of the plurality of stored electronic signatures characterizes electrical characteristics of a non-linear device.

5. The method of claim 1, further comprising:
determining a second electronic signature from the signal captured from the power line;
inferring presence and identity of a second non-linear device on the power line based, at least in part, on the second electronic signature;
retrieving information corresponding to the second non-linear device based, at least in part, on the inferred identity of the second non-linear device; and
determining an aggregate distortion based, at least in part, on the retrieved information corresponding to the first non-linear device and the retrieved information corresponding to the second non-linear device;
wherein said determining the distortion mitigating adjustment comprises determining the distortion mitigating adjustment that mitigates the determined aggregate distortion when communicating on the power line.

6. The method of claim 1 further comprising capturing the signal on the power line while the powerline communication network is idle, wherein the signal is out-of-band with respect to powerline communications on the power line.

7. The method of claim 1 further comprising:
transmitting a test signal to a receiving powerline communication device, wherein the test signal is representative of a powerline communication signal for messaging and data communications on the power line.

8. The method of claim 1 further comprising determining an estimate of an electrical distance of the first non-linear device inferred as present with respect to a powerline communication device that captured the signal.

9. The method of claim 7 further comprising capturing the signal on the power line while transmitting the test signal to the receiving powerline communication device, wherein the signal is out-of-band with respect to the data communications on the power line.

10. The method of claim 9 further comprising receiving inferences about an intervening non-linear device from a receiving powerline communication device that are based, at least in part, on the transmitted test signal, wherein said determining the distortion mitigating adjustments to apply when communicating on the power line to mitigate distortion produced by the intervening non-linear device also use the inferences communicated from the receiving powerline communication device, wherein the inferences about the intervening non-linear device include an inference by the receiving powerline communication device that the intervening non-linear device is present between the receiving powerline communication device and a transmitting powerline communication device that transmitted the test signal and an inference as to an identity of the intervening non-linear device.

11. A non-transitory machine-readable storage medium having program instructions stored therein that are executable by a machine, the program instructions comprising program instructions to:
determine a first electronic signature from a signal captured from a power line of a powerline communication network;
infer presence and identity of a first non-linear device on the power line based, at least in part, on the first electronic signature;
retrieve information corresponding to the first non-linear device based, at least in part, on the inferred identity of the first non-linear device; and
determine a distortion mitigating adjustments to apply when transmitting on the power line based, at least in part, on the retrieved information for the non-linear device, wherein the distortion mitigating adjustment comprises reducing transmit power level at one or more carrier frequencies when transmitting on the power line.

12. The non-transitory machine-readable storage medium of claim 11, wherein the program instructions to determine the first electronic signature from the signal captured from the power line comprise program instructions to sample at least an out-of-band signal on the power line, wherein the signal is out-of-band with respect to powerline communications.

13. The non-transitory machine-readable storage medium of claim 11, wherein the program instructions further comprise program instructions to determine a second electronic signature from the signal captured from the power line, wherein the program instructions to determine the first electronic signature and the second electronic signature comprise program instructions to analyze the signal in a frequency-time domain and isolate the first electronic signature and the second electronic signature based, at least in part, on analysis of the signal in the frequency-time domain.

14. The non-transitory machine-readable storage medium of claim 11, wherein the program instructions to infer presence and identity of the non-linear device on the power line based, at least in part, on the first electronic signature comprises program instructions to:
determine that the first electronic signature is most similar to a first stored electronic signature of a plurality of stored electronic signatures within a defined margin of acceptable variance, wherein each of the plurality of stored electronic signatures characterizes electrical characteristics of a non-linear device.

15. The non-transitory machine-readable storage medium of claim 11, wherein the program instructions further comprise program instructions to capture the signal on the power line while the powerline communication network is idle, wherein the signal is out-of-band with respect to powerline communications on the power line.

16. The non-transitory machine-readable storage medium of claim 11, wherein the program instructions further comprise program instructions to:
transmit a test signal to a receiving powerline communication device, wherein the test signal is representative of a powerline communication signal for messaging and data communications on the power line.

17. The non-transitory machine-readable storage medium of claim 11, wherein the program instructions further comprise program instructions to determine an estimate of an electrical distance of the first non-linear device inferred as present with respect to a powerline communication device that captured the signal.

18. The non-transitory machine-readable storage medium of claim 16, wherein the program instructions further comprise program instructions to capture the signal on the power line while the test signal is being transmitted to the receiving powerline communication device, wherein the signal is out-of-band with respect to the data communications on the power line.

19. An apparatus comprising:
   a processor;
   a powerline transmitter coupled with the processor;
   a powerline receiver coupled with the processor;
   a non-linear device detection unit coupled with the powerline transmitter, the powerline receiver, and the processor, the non-linear device detection unit operable to,
      determine an electronic signature from an out-of-band signal received by the powerline receiver from a power line, wherein the out-of-band signal is out-of-band with respect to powerline communications;
      infer presence and identity of a non-linear device on the power line based, at least in part, on the electronic signature;
      retrieve information corresponding to the non-linear device based, at least in part, the inferred identity of the non-linear device; and
   a non-linear distortion adjustment unit coupled with the non-linear device detection unit and the powerline transmitter, the non-linear distortion adjustment unit operable to,
      determine a distortion mitigating adjustment to apply to the powerline transmitter when transmitting on the power line based, at least in part, on the retrieved information for the non-linear device, wherein the distortion mitigating adjustment comprises causing the powerline transmitter to reduce transmit power level at one or more carrier frequencies when the power-line transmitter transmits on the power line.

20. The apparatus of claim 19, wherein the non-linear device detection unit is further operable to,
   transmit, via the powerline transmitter, an in-band test signal that is representative of a powerline communication signal for messaging and data communications on the power line;
   determine an electronic signature from an in-band signal received via the powerline receiver;
   infer presence and identity of a non-linear device on the power line based, at least in part, on the electronic signature determined from the in-band signal;
   retrieve information specified for a non-linear device with the inferred identity; and
   transmit, via the powerline transmitter, at least the inferred identity of the non-linear device to a powerline communication device that transmitted the in-band signal.

* * * * *